US008817813B2

(12) United States Patent
Iyer et al.

(10) Patent No.: US 8,817,813 B2
(45) Date of Patent: Aug. 26, 2014

(54) SYSTEM AND METHOD FOR ADAPTIVE CHANNEL SCANNING WITHIN A WIRELESS NETWORK

(75) Inventors: Pradeep J. Iyer, Cupertino, CA (US); Partha Narasimhan, Santa Clara, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 538 days.

(21) Appl. No.: 11/542,327

(22) Filed: Oct. 2, 2006

(65) Prior Publication Data

US 2008/0080420 A1   Apr. 3, 2008

(51) Int. Cl.
*H04J 3/16* (2006.01)
*H04W 8/00* (2009.01)
*H04W 84/12* (2009.01)
*H04W 88/08* (2009.01)

(52) U.S. Cl.
CPC .............. *H04W 8/005* (2013.01); *H04W 84/12* (2013.01); *H04W 88/08* (2013.01)
USPC ......................................... 370/465; 370/328

(58) Field of Classification Search
USPC .......... 370/465, 311, 318, 329; 455/434, 522, 455/450, 451, 452.1, 13.4, 574
See application file for complete search history.

(56) References Cited

U.S. PATENT DOCUMENTS

| | | | |
|---|---|---|---|
| 6,047,325 A | 4/2000 | Jain et al. | |
| 6,115,376 A | 9/2000 | Sherer et al. | |
| 6,347,091 B1 * | 2/2002 | Wallentin et al. | 370/437 |
| 6,363,421 B2 | 3/2002 | Barker et al. | |
| 6,493,698 B1 | 12/2002 | Beylin | |
| 6,567,405 B1 | 5/2003 | Borella et al. | |
| 6,674,738 B1 | 1/2004 | Yildiz et al. | |
| 6,693,888 B2 | 2/2004 | Cafarelli et al. | |
| 6,708,218 B1 | 3/2004 | Ellington, Jr. et al. | |
| 6,728,782 B1 | 4/2004 | D'Souza et al. | |
| 6,792,395 B2 | 9/2004 | Roberts | |
| 6,865,673 B1 | 3/2005 | Nessett et al. | |
| 6,917,804 B2 | 7/2005 | Takayama et al. | |
| 6,954,790 B2 | 10/2005 | Forslow | |
| 6,957,067 B1 | 10/2005 | Iyer et al. | |
| 6,965,929 B2 | 11/2005 | Kumar | |
| 7,039,027 B2 | 5/2006 | Bridgelall | |
| 7,042,852 B2 | 5/2006 | Hrastar | |
| 7,068,999 B2 | 6/2006 | Ballai | |
| 7,110,762 B1 * | 9/2006 | Cameron et al. | 455/434 |
| 7,181,530 B1 | 2/2007 | Halasz et al. | |
| 7,203,195 B2 | 4/2007 | Hidaka et al. | |
| 7,295,524 B1 | 11/2007 | Gray et al. | |
| 7,376,113 B2 | 5/2008 | Taylor et al. | |

(Continued)

OTHER PUBLICATIONS

U.S. Appl. No. 11/171,913, Non-Final Rejection Action mailed May 15, 2008.

(Continued)

*Primary Examiner* — Kibrom T Hailu
(74) *Attorney, Agent, or Firm* — Varun A. Shah (57) ABSTRACT

An access point device that is adapted to a wireless network and a wired network is disclosed. The access point includes a transceiver to receive wireless frames from a plurality of wireless devices of the wireless network, respectively, and at least one component to process information extracted from the wireless frames and to control channel scanning based upon at least one of an amount of wireless device traffic and a type of call.

20 Claims, 5 Drawing Sheets

(56) References Cited

U.S. PATENT DOCUMENTS

| | | |
|---|---|---|
| 7,969,950 B2 | 6/2011 | Iyer et al. |
| 2001/0056550 A1 | 12/2001 | Lee |
| 2002/0015422 A1 | 2/2002 | Inada et al. |
| 2002/0069278 A1 | 6/2002 | Forslow |
| 2002/0087882 A1 | 7/2002 | Schneer et al. |
| 2002/0099503 A1 | 7/2002 | Mishra |
| 2002/0159418 A1 | 10/2002 | Rudnick et al. |
| 2002/0191548 A1 | 12/2002 | Ylonen et al. |
| 2003/0017826 A1 | 1/2003 | Fishman et al. |
| 2003/0018760 A1 | 1/2003 | Putzolu et al. |
| 2003/0023711 A1 | 1/2003 | Parmar et al. |
| 2003/0031151 A1 | 2/2003 | Sharma et al. |
| 2003/0039234 A1 | 2/2003 | Sharma et al. |
| 2003/0135762 A1 | 7/2003 | Macaulay |
| 2003/0142641 A1 | 7/2003 | Sumner et al. |
| 2003/0196105 A1 | 10/2003 | Fineberg |
| 2003/0221006 A1 | 11/2003 | Kuan et al. |
| 2003/0231649 A1 | 12/2003 | Awoseyi et al. |
| 2004/0003285 A1 | 1/2004 | Whelan et al. |
| 2004/0023640 A1 | 2/2004 | Ballai |
| 2004/0049699 A1 | 3/2004 | Griffith et al. |
| 2004/0090943 A1 | 5/2004 | da Costa et al. |
| 2004/0203593 A1 | 10/2004 | Whelan et al. |
| 2004/0209621 A1* | 10/2004 | Teshirogi .............. 455/450 |
| 2005/0107041 A1* | 5/2005 | Eder .............. 455/77 |
| 2005/0114649 A1 | 5/2005 | Challener et al. |
| 2005/0281234 A1* | 12/2005 | Kawamura et al. .......... 370/338 |
| 2005/0285803 A1* | 12/2005 | Iacono et al. .......... 343/702 |
| 2006/0013188 A1* | 1/2006 | Wiatrowski et al. ......... 370/347 |
| 2006/0069526 A1 | 3/2006 | Kaiser et al. |
| 2006/0126659 A1 | 6/2006 | Baum et al. |
| 2007/0053362 A1* | 3/2007 | Garg .............. 370/395.1 |
| 2007/0078974 A1* | 4/2007 | Krishnan .............. 709/224 |
| 2007/0160003 A1* | 7/2007 | Meier .............. 370/329 |
| 2007/0294747 A1 | 12/2007 | Rosenberger |
| 2008/0175166 A1* | 7/2008 | Oerton .............. 370/254 |
| 2008/0181184 A1* | 7/2008 | Kezys .............. 370/338 |
| 2008/0253327 A1* | 10/2008 | Kohvakka et al. ............ 370/330 |
| 2009/0013073 A1 | 1/2009 | Chaskar et al. |
| 2009/0016529 A1 | 1/2009 | Gopinath et al. |
| 2009/0028118 A1 | 1/2009 | Gray et al. |
| 2009/0235354 A1 | 9/2009 | Gray et al. |
| 2009/0271864 A1 | 10/2009 | Dietrich et al. |

OTHER PUBLICATIONS

U.S. Appl. No. 11/171,913 Final Rejection Action mailed Oct. 17, 2008.
U.S. Appl. No. 11/171,913, Non-Final Rejection Action mailed Jan. 11, 2010.
U.S. Appl. No. 11/171.813, Final Rejection Action mailed Apr. 30, 2010.
U.S. Appl. No. 12/401,553 Office Action mailed Aug. 19, 2011.
U.S. Appl. No. 10/368,152 Office Action mailed Jun. 15, 2007.
U.S. Appl. No. 10/368,152 Office Action mailed Jun. 18, 2007.
U.S. Appl. No. 11/869,624 Office Action mailed Jul. 19, 2011.
U.S. Appl. No. 11/869,624 Office Action mailed Mar. 2, 2011.
J. Case et al., "RFC 1157—A Simple Network Management Protocol (SNMP)", 1990, pp. cover.
Beyah et al. "Rogue Access Point Detection using Temporal Traffic Characteristics", 2004, IEEE Communications Society, Globecom 2004, 0-7803-8794-5/04. p. 2272.

* cited by examiner

SYSTEM AND METHOD FOR ADAPTIVE CHANNEL SCANNING WITHIN A WIRELESS NETWORK

FIELD

Embodiments of the invention relate to the field of wireless communications, and in particular, to a mechanism that provides for adaptive channel scanning within a wireless network.

GENERAL BACKGROUND

Over the last decade or so, for most businesses, it has become a necessity for employees to share data over an enterprise network featuring one or more local area networks. To improve efficiency, enhancements have been added to a local area network such as remote wireless access. This enhancement provides an important extension in forming a wireless local area network (WLAN).

Typically, a WLAN supports communications between wireless devices and Access Points (APs). In general, each AP operates as a relay station by supporting communications with both wireless devices being part of a wireless network and resources of a wired network.

In order to effectively service multiple wireless devices that receive and transmit information on different channels through the AP to other wireless devices and to the wired network, APs typically perform some sort of channel scanning functionality. Typically, the AP will periodically scan other channels, to measure coverage and interference characteristics.

However, when the AP is scanning other channels, it cannot service wireless devices on its current operating channel. Present methods for channel scanning employed by APs are inefficient in that they do not take into the amount and type of wireless traffic in making channel scanning decisions.

BRIEF DESCRIPTION OF THE DRAWINGS

The invention may best be understood by referring to the following description and accompanying drawings that are used to illustrate embodiments of the invention.

DETAILED DESCRIPTION

Embodiments of the invention relate to a system and method for adaptive channel scanning within a wireless network. In one embodiment, an access point device adapted to a wireless network and wired network implements adaptive channel scanning operations The access point device may include a transceiver that receives wireless frames from a plurality of wireless devices of the wireless network, respectively, and at least one component to process information extracted from the wireless frames. More particularly, the access point device may control channel scanning based upon at least one of an amount of wireless device traffic and a type of call, as will be described in detail hereinafter.

Herein, the invention may be applicable to a variety of wireless networks such as a wireless local area network (WLAN) or wireless personal area network (WPAN). The WLAN may be configured in accordance with any Institute of Electrical and Electronics Engineers (IEEE) 802.11 standard such as an IEEE 802.11b standard entitled "Wireless LAN Medium Access Control (MAC) and Physical Layer (PHY) specifications: Higher-Speed Physical Layer Extension in the 2.4 GHz Band" (IEEE 802.11b, 1999), an IEEE 802.11a standard entitled "Wireless LAN Medium Access Control (MAC) and Physical Layer (PHY) specifications: High-Speed Physical Layer in the 5 GHz Band" (IEEE 802.11a, 1999) or a revised IEEE 802.11 standard "Wireless LAN Medium Access Control (MAC) and Physical Layer (PHY) specifications" (IEEE 802.11, 1999). Of course, the invention may be compliant with systems configured in accordance with High Performance Radio Local Area Networks (Hiper-LAN) or subsequently published specifications.

Certain details are set forth below in order to provide a thorough understanding of various embodiments of the invention, albeit the invention may be practiced through many embodiments other than those illustrated. Well-known logic and operations are not set forth in detail in order to avoid unnecessarily obscuring this description.

In the following description, certain terminology is used to describe features of the invention. For example, a "component" includes hardware and/or software module(s) that are configured to perform one or more functions. For instance, a "processor" is logic that processes information. Examples of a processor include a microprocessor, an application specific integrated circuit, a digital signal processor, a micro-controller, a finite state machine, or even combinatorial logic.

A "software module" is executable code such as an operating system, an application, an applet or even a routine. Software modules may be stored in any type of memory, namely suitable storage medium such as a programmable electronic circuit, a semiconductor memory device, a volatile memory (e.g., random access memory, etc.), a non-volatile memory (e.g., read-only memory, flash memory, etc.), a floppy diskette, an optical disk (e.g., compact disk or digital versatile disc "DVD"), a hard drive disk, tape, or any kind of interconnect (defined below).

An "interconnect" is generally defined as an information-carrying medium that establishes a communication pathway. Examples of the medium include a physical medium (e.g., electrical wire, optical fiber, cable, bus traces, etc.) or a wireless medium (e.g., air in combination with wireless signaling technology).

"Information" is defined as data, address, control or any combination thereof. For transmission, information may be transmitted as a message, namely a collection of bits in a predetermined format. One particular type of message is a frame including a header and a payload, each having a predetermined number of bits of information.

I. General Architecture

Figure 1:
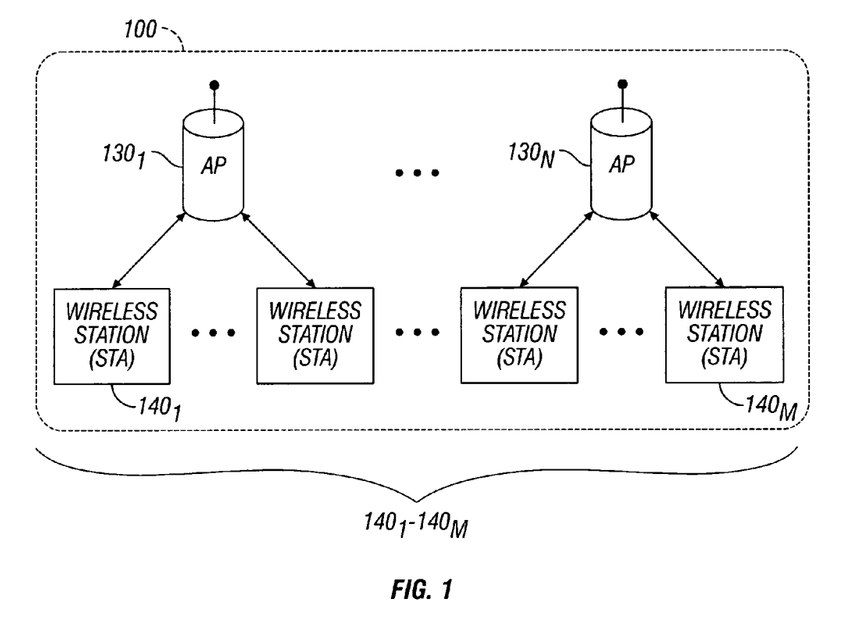
FIG. 1 is a diagram illustrating an exemplary embodiment of a wireless local area network (WLAN) in which embodiments of the invention may be practiced.

Referring to FIG. 1, an exemplary embodiment of a wireless network 100 for use in an enterprise network in which embodiments of the invention may be practiced is illustrated. Herein, wireless network 100 includes one or more Access Points (APs) $130_1$-$130_N$ (N≥1) and one or more wireless stations (STAs) $140_1$-$140_M$ (M≥1), which are in wireless communication with APs $130_1$-$130_N$.

Figure 2:
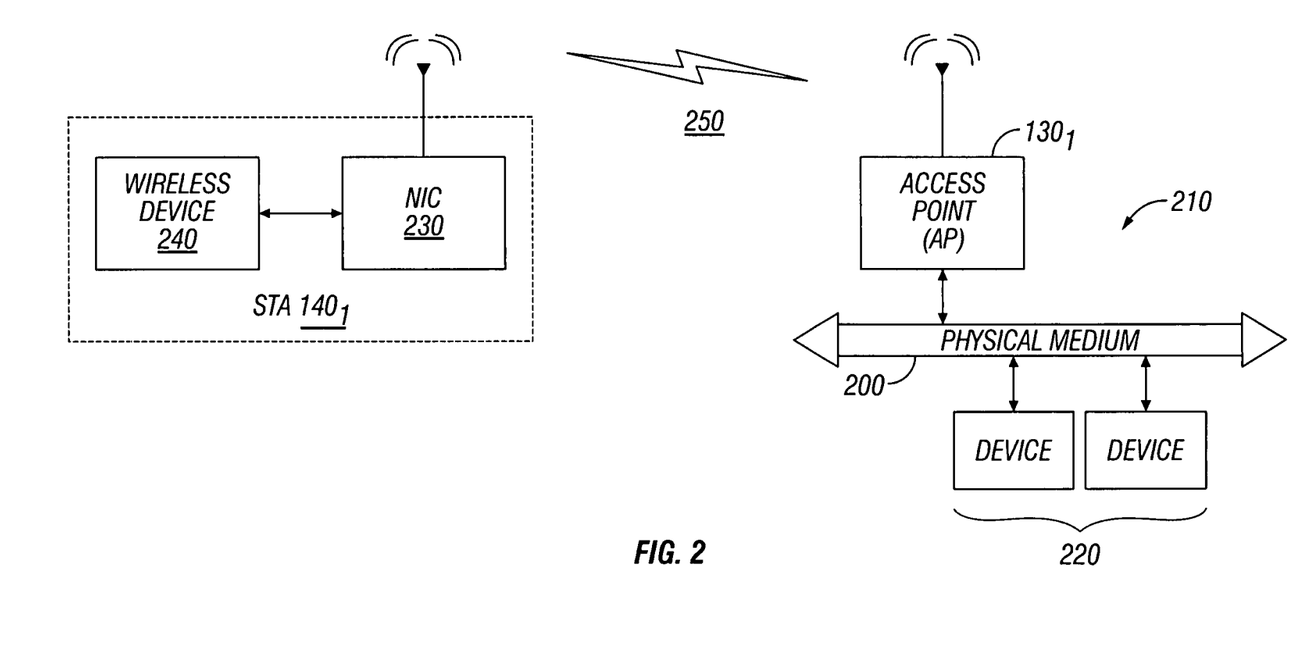
FIG. 2 is a diagram illustrating an exemplary embodiment of an Access Point of the WLAN of FIG. 1 in communication with a wireless station for use in an enterprise network.

As shown in FIG. 2, each AP $130_1$, ..., or $130_N$ supports bi-directional communications by (i) receiving data frames and transmitting data from these frames onto a physical medium 200 that forms part of a wired network 210 and (ii) receiving data from wired network 210 and transmitting data frames to one or more targeted STAs $140_1$, ..., $140_M$; to form a portion of the enterprise network.

Wired network 210 can be of any type of wired network, including but not limited or restricted to Ethernet, Token Ring, Asynchronous Transfer Mode (ATM) or the like. Moreover, wired network 210 features resources that are available for users of wireless network 100. Such resources may include devices 220 for data storage, which are coupled to physical medium 200.

STA $140_1$ includes a removable, wireless network interface card (NIC) 230 that is separate from or employed within a wireless device 240 that processes information (e.g., computer, personal digital assistant "PDA", telephone, alphanumeric pager, etc.). Normally, NIC 230 comprises a wireless transceiver, although it is contemplated that NIC 230 may feature only receive (RX) or transmit (TX) functionality such that only a receiver or transmitter is implemented.

STA $140_1$ communicates with and accesses information from AP $130_1$ over the air 250 in accordance with IEEE 802.11 communications protocol or another wireless networking protocol. Hence, AP $130_1$ generally operates as a transparent bridge connecting both a wireless network featuring STA $140_1$ with wired network 210.

Each AP 130 scans different frequency channels and maintains information about the other APs $130_1$-$130_N$ and STAs $140_1$-$140_M$ in wireless network 100. Generally, each AP 130 monitors wireless network 100 to extract information from wireless frames. Examples of wireless frames include, but are not limited or restricted to IEEE 802.11 data frames, Beacon frames, HiperLAN frames or the like. This information may be used to influence the behavior of wireless network 100.

Figure 3:
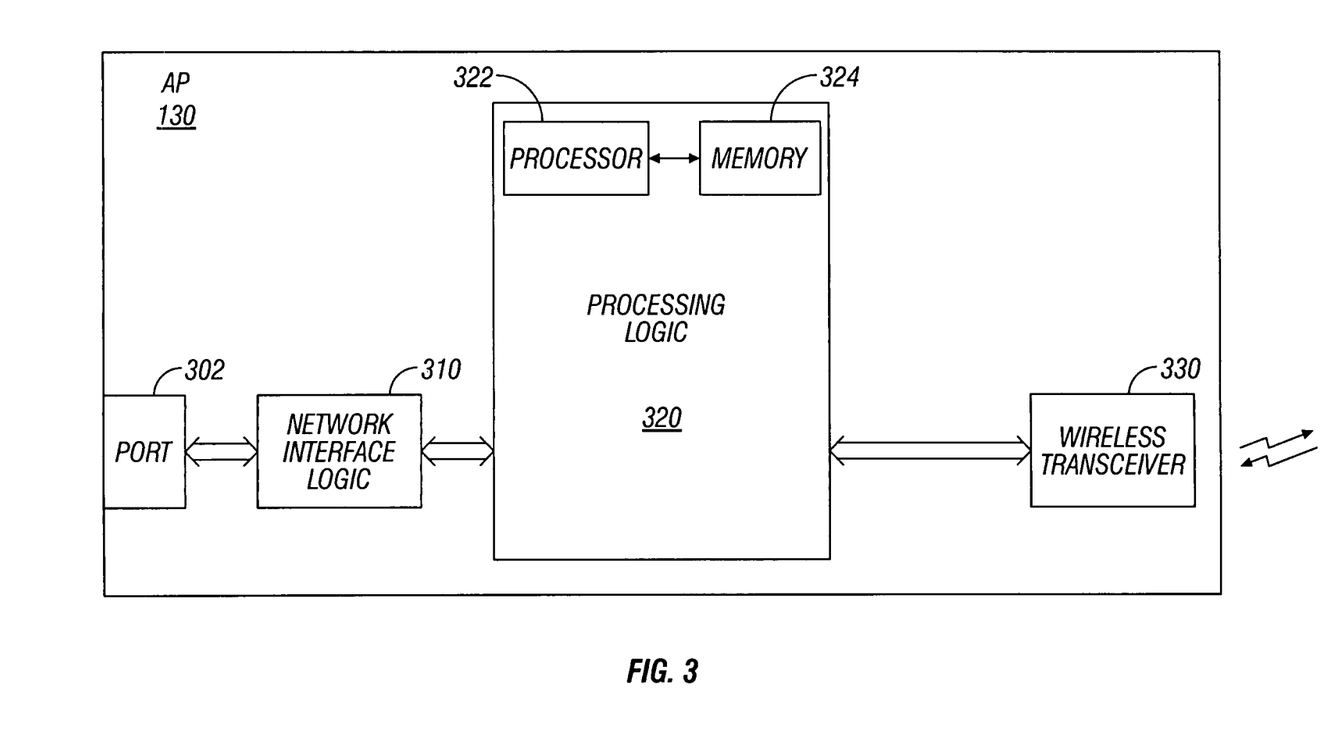
FIG. 3 is a diagram illustrating a particular exemplary embodiment of an AP.

Referring to FIG. 3, an exemplary embodiment of an AP 130 is shown. AP 130 comprises port 302, network interface logic 310, processing logic 320, and wireless transceiver 330. Processing logic 320 may include a processor 322 and memory 324. As optional features, AP 130 may further comprise one or more additional ports (e.g., a second port) and corresponding wired interface logic to support wired communications with a client device in lieu of wireless communications over wireless transceiver.

According to the illustrated embodiment, port 302 is adapted for coupling with the data transfer device (not shown), and therefore, enables the receipt of messages from and the transmission of messages to the main network over interconnect 200 of FIG. 2.

Network interface logic 310 is configured as a combination of hardware and software to control the transmission and receipt of information at the physical (PHY) and data link (MAC) layers (also referred to as "OSI Layer 1 and OSI Layer 2").

For example, network interface logic 310 may be adapted as an Ethernet controller including or coupled with processing logic 320. An Ethernet controller provides Internet connectivity and operates to extract information from incoming messages. The extracted information may include destination, source or intermediary addresses, payload data, management or control information, or the like. Similarly, an Ethernet controller may be adapted to insert information into outgoing messages as well.

Wireless transceiver 330 comprises an antenna, a power amplifier, and other circuitry to support the radio functionality. More specifically, for one embodiment of the invention supporting IEEE 802.11 communication standards, wireless transceiver 330 comprises an antenna to receive incoming wireless messages.

The wireless message(s) include IEEE 802.11 MAC frames encoded and carried within a frequency channel that is located within a carrier frequency band. The carrier frequency band is located within typical radio frequency (RF) band of frequencies. For example, the RF band may generally fall within an approximate range of 2.4-2.5 GHz or perhaps an approximate range of 5-5.25 GHz. It is contemplated, though, that the invention may be applied to any frequency range.

Wireless transceiver 330 isolates the frequency channel on which data is carried from all the other frequencies received on the antenna. This may be accomplished through a tunable filter tuned to a center frequency of a channel of interest. The data channel undergoes a frequency shifting from the carrier band to baseband and the baseband analog radio signal is routed to an analog-to-digital converter (ADC). The ADC samples the baseband analog radio signal and converts it into digital information, which is transferred to processor 320 and may be processed according to the operational flow set forth in FIGS. 4 and 5.

As previously described, utilizing wireless transceiver 330, each AP 130 scans different frequency channels and further within memory 324 of processing logic 320 may store information about the other APs $130_1$-$130_n$ and STAs $140_1$-$140_n$ (i.e. wireless devices) and wireless network 100. Generally, each AP 130 monitors wireless network 100 to extract information from wireless frames. Examples of wireless frames include, but are not limited or restricted to IEEE 802.11 data frames, beacon frames, HiperLAN frames are the like.

For example, the processing logic 320 of each AP 130 may extract and process information from received wireless frames and may store that information as data structures describing each of the other APs $130_1$-$130_n$ being monitored as well as the wireless devices $140_1$-$140_n$ being monitored in the wireless network. Such information is recovered from the wireless frames received by the AP 130.

For example, each AP, for each wireless device being monitored, may store a wireless device ID for the wireless device, a channel identifier identifying the channel upon which the identified wireless device is operating, the amount of wireless device traffic associated with the wireless device, as well as the type of communication (e.g. voice call, e-mail, etc.) from the wireless device.

Figure 4:
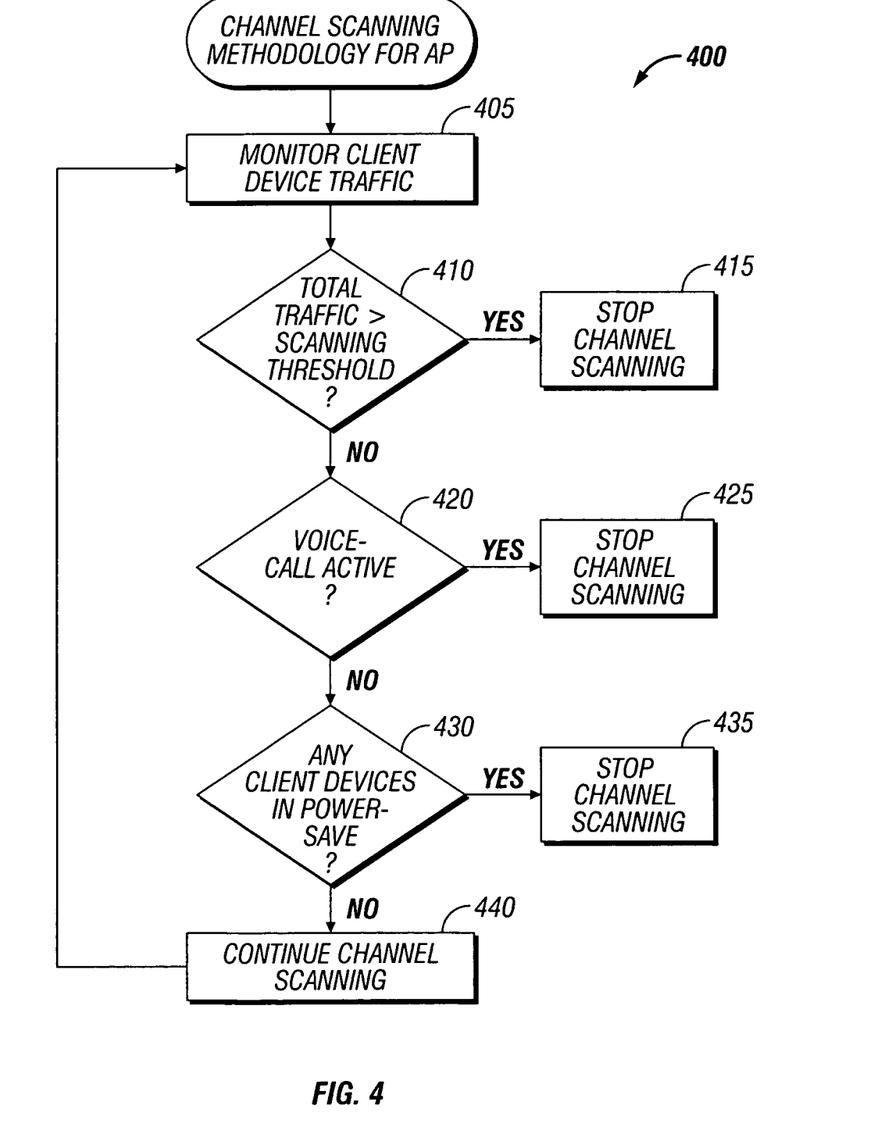
FIG. 4 is flowchart of operations for adaptive channel scanning for an access point within a wireless network, according to one embodiment of the invention.

Utilizing this type of information, the AP 130 can make intelligent choices in adaptive channel scanning between the wireless devices of the wireless network and the wired network. This adaptive channel scanning methodology will be hereinafter discussed with reference to FIGS. 4 and 5. Referring now to FIG. 4, a general flowchart of operations for adaptive channel scanning for an AP within a wireless network, according to one embodiment of the invention, is shown.

Initially, AP 130 monitors the wireless network for wireless client device traffic on a particular channel (Block 405). In this way, the AP 130 utilizing processing logic 320 may process information extracted from wireless frames in order to control channel scanning based upon at least one of an amount of wireless device traffic and a type of call.

More specifically, as shown in process 400, the AP monitors the amount of wireless device traffic for a given channel and if it is determined to be greater than a scanning threshold (Block 410), then channel scanning is stopped (Block 415). In particular, in one embodiment, the scanning threshold may be an approximately 500 frames of wireless device traffic within approximately one second period of time. In this instance, channel scanning is stopped because the channel is busy with wireless client device traffic and if channel scanning were continued data may be lost.

Next, process 400 moves on to decision block 420 where it is determined whether or not a voice call is active. If a voice call is active, then channel scanning is stopped. Because voice call frames occur approximately every 20 milliseconds, there is no time to continue channel scanning without a very significant chance of losing voice-call packets. Therefore, channel scanning is stopped and the AP remains tuned to the voice call channel.

Next, process 400 moves to decision block 430 where it is determined whether any of the wireless client devices being monitored are currently in a power-save mode. If so, channel scanning is stopped (Block 435). This is because if scanning was continued and a wireless client device exited a power save mode to transmit information, the AP may miss the transmission.

Assuming none of the traffic, voice call or power-save conditions are true then the AP will continue with channel scanning (Block 440) and will also monitor for client device traffic (Block 405) and continue employing process 400.

The above methodology increases the efficiency of the wireless network because channel scanning is stopped when a condition exists that may result in the loss of data traffic from a wireless device.

Figure 5:
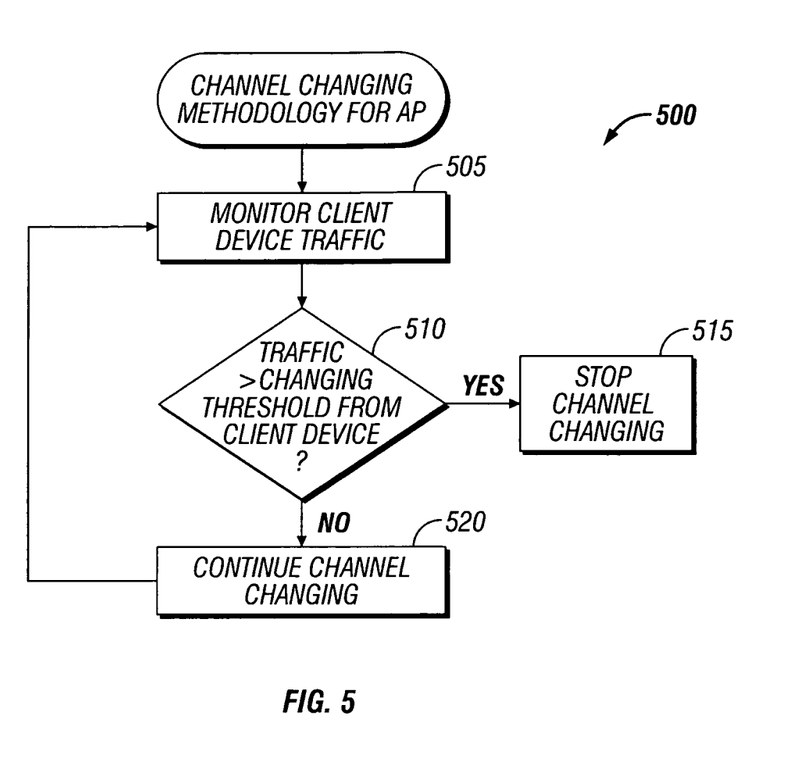
FIG. 5 is a flowchart of operations for adaptive channel changing for an access point within a wireless network, according to one embodiment of the invention.

With reference also to FIG. 5, FIG. 5 is a general flowchart of operations for a channel changing methodology for an access point within a wireless network, according to one embodiment of the invention. Particularly, at Block 505, client device traffic is monitored by the AP.

More particularly, at Block 510, process 500 determines whether the amount of wireless device traffic from a wireless device for a particular channel is above a changing threshold. If so, at Block 515 channel changing is stopped. In one embodiment, the changing threshold may be at least one frame of wireless device traffic received from a client device within approximately one minute. In this way, if there has been any significant amount of wireless device traffic received from a client on this channel during this period of time, it is indicative that more traffic may be received from this wireless device such that it is more efficient to stop channel changing.

However, if this threshold is not met, then the process 500 of the AP continues channel changing (Block 520) and again monitors for client device traffic (Block 505) and process 500 is reiterated.

By utilizing the above methodologies as set forth in processes 400 and 500 of FIGS. 4 and 5, respectively, efficient channel scanning and changing methods for an AP are disclosed that are based on total traffic, the type of call, as well as power-save status, to indicate points at which channel scanning and changing are not efficient for the wireless network. At these points, channel scanning and changing are stopped. In this way, the overall efficiency of the network is increased because channel scanning and changing are stopped at points that may result in a significant increase in the probability of lost data traffic.

While the invention has been described in terms of several embodiments, the invention should not be limited to only those embodiments described, but can be practiced with modification and alteration within the spirit and scope of the appended claims. The description is thus to be regarded as illustrative instead of limiting.

What is claimed is:

1. An access point comprising:
    a transceiver to scan wireless frames from one or more wireless devices on one or more channels;
    wherein the access point is configured to perform operations comprising: determining an amount of wireless device traffic on the one or more channels;
    comparing the amount of wireless device traffic on the one or more channels to a threshold;
    responsive to determining that the amount of wireless device traffic on the one or more channels exceeds the threshold, at least temporarily stopping channel scanning.

2. An access point comprising:
    a transceiver to scan wireless frames from one or more wireless devices;
    wherein the access point is configured to perform operations comprising:
        scanning wireless device data traffic on a plurality of channels at least by periodically changing the channels being scanned by the access point;
    determining an amount of wireless device traffic on a particular channel;
    comparing the amount of wireless device traffic on the particular channel to a threshold;
    responsive to determining that the amount of wireless device traffic on the particular channel exceeds the threshold, at least temporarily stopping the changing of the channels being scanned by the access point.

3. A method non-transitory computer readable medium comprising instructions which, when executed by one or more hardware processors, causes performance of operations comprising:
    determining an amount of wireless device traffic on one or more channels;
    comparing the amount of wireless device traffic on the one or more channels to a threshold;
    responsive to determining that the amount of wireless device traffic on one or more channels exceeds the threshold, at least temporarily stopping channel scanning.

4. A non-transitory computer readable medium comprising instructions which, when executed by one or more hardware processors, causes performance of operations comprising:
    scanning wireless data traffic on a plurality of channels at least by periodically changing the channels being scanned by the access point;
    determining an amount of wireless device traffic on a particular channel;
    comparing the amount of wireless device traffic on the particular channel to a threshold;
    responsive to determining that the amount of wireless device traffic on the particular channel exceeds the threshold, at least temporarily stopping the changing of the channels being scanned by the access point.

5. The access point of claim 1 wherein the amount of wireless device traffic is determined for a single channel.

6. The access point of claim 1 wherein the amount of wireless device traffic is determined for a plurality of channels.

7. The access point of claim 1 wherein at least temporarily stopping channel scanning is further responsive to a type of wireless device traffic detected by the access point.

8. The access point of claim 1 wherein at least temporarily stopping channel scanning is further responsive to an operating mode of at least one of the one or more wireless devices.

9. The access point of claim 1 wherein the threshold is approximately 500 frames of wireless device traffic within one second.

10. The access point of claim 2 wherein at least temporarily stopping the changing of the channels is further responsive to a type of wireless device traffic detected by the access point.

11. The access point of claim 2 wherein at least temporarily stopping the changing of the channels is further responsive to an operating mode of at least one of the one or more wireless devices.

12. The access point of claim 2 wherein the threshold is in a range of approximately 500 frames of wireless device traffic within one second.

13. The access point of claim 3 wherein the amount of wireless device traffic is determined for a single channel.

14. The access point of claim 3 wherein the amount of wireless device traffic is determined for a plurality of channels.

15. The medium of claim 3 wherein at least temporarily stopping channel scanning is further responsive to a type of wireless device traffic detected by the access point.

16. The medium of claim 3 wherein at least temporarily stopping channel scanning is further responsive to an operating mode of at least one of the one or more wireless devices.

17. The medium of claim 3 wherein the threshold is in a range of approximately 500 frames of wireless device traffic within one second.

18. The medium of claim 4 wherein at least temporarily stopping the changing of the channels is further responsive to a type of wireless device traffic detected by the access point.

19. The medium of claim 4 wherein at least temporarily stopping the changing of the channels is further responsive to an operating mode of at least one of the one or more wireless devices.

20. The medium of claim 4 wherein the threshold is in a range of approximately 500 frames of wireless device traffic within one second.

* * * * *